Jan. 30, 1968   G. E. MYCUE   3,366,775
ELECTRIC CENSER STRUCTURE
Filed Oct. 14, 1965
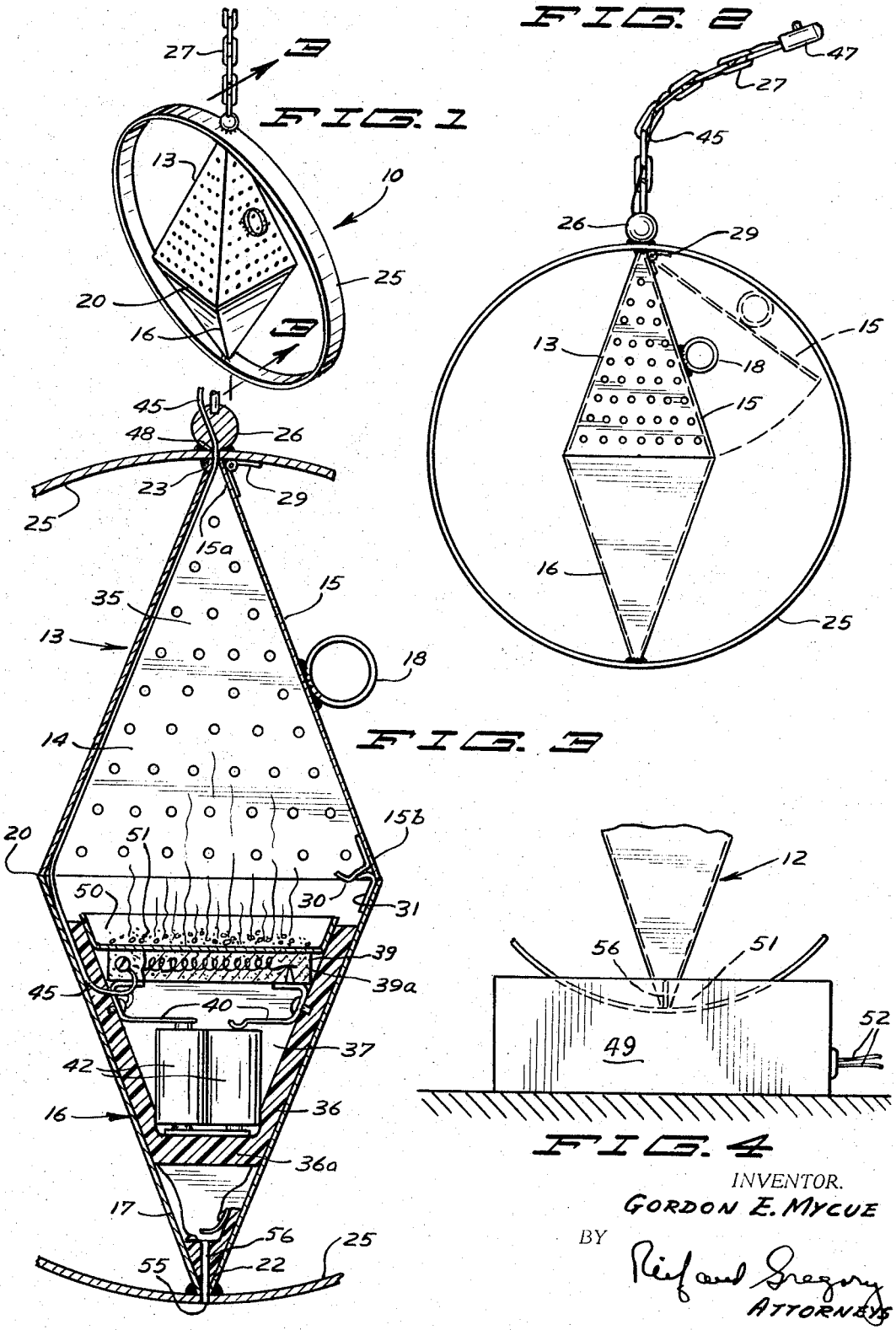
INVENTOR.
GORDON E. MYCUE
BY
Richard Gregory
ATTORNEYS – # 3,366,775
ELECTRIC CENSER STRUCTURE
Gordon E. Mycue, Hamel, Minn. 55340
Filed Oct. 14, 1965, Ser. No. 496,065
5 Claims. (Cl. 219—272)

ABSTRACT OF THE DISCLOSURE

A portable electric censer having a self contained energy supply consisting of a housing supported within a ring-like enclosure having holding means, said housing having an upper portion of imperforate walls and having a lower portion containing a battery, a heating element energized by said battery, a switch in connection with a circuit including said battery and said heating element and a receptacle overlying said heating element containing incense.

---

The invention herein relates to improvement in a portable electric censer.

It is desirable to have and an object of this invention to provide a portable electric censer having an independent self-contained energy supply.

It is a further object of this invention to provide an electric censer having a protective encircling member and having a convenient means for carrying and operating the same.

It is also an object of this invention to provide a simply constructed electric censer arranged and formed for ready access thereinto, and particularly for the removal and insertion of the working parts therein.

These and other objects and advantages of the invention will be set forth in the following description made in connection with the accompanying drawings in which like reference characters refer to similar parts throughout the several views and in which:

FIG. 1 is a view in perspective with a portion thereof being broken away;

FIG. 2 is a view in side elevation with a portion thereof shown in alternate position in dotted line;

FIG. 3 is a view on an enlarged scale in vertical section taken on line 3—3 of FIG. 1 as indicated; and FIG. 4 is a broken view of a detail showing a supporting apparatus and showing portions seated therein in dotted line.

Referring to the drawings, the device herein is indicated generally by the numeral 10.

The housing 12 of said device in the preferred form shown comprises a pair of upper and lower reversely disposed rectangular pyramidical portions 13 and 16 having their respective base portions abutting to define a medial line 20.

Said housing 12 is disposed within an encircling flat walled protective ring-like member 25 with the vertices 22 and 23 of said housing being respectively secured to inner wall portions of said member 25 as by welding.

The upper pyramidical portion 13 of said housing comprises perforated walls 14 with one such wall indicated by the numeral 15 forming a door pivoted at its upper end portion 15a to said encircling member 25 by an appropriate hinge 29, said hinge being secured in position as by welding. The lower end portion 15b of said door carries a spring clip fastener 30 which engages a holding member 31 secured to an adjacent lower portion of said housing. Said door 15 carries a convenient ring-like handle 18.

Formed within said upper portion 13 is a chamber 35. Mounted on said encircling member 25 aligned with said vertex 23 is a finial 26. Extending through said vertex and through said finial is an aperture 48. Secured to said finial and extending upwardly therefrom is a handle portion 27 formed as a link chain carrying at its free end a switch 47.

The lower pyramidical portion 16 of said housing comprises imperforate walls 17. Seated within said lower portion 16 in the form of a frustrum is a retaining and insulating lining member 36 having a flat bottom wall 36a and having therein a chamber 37. Said member 36 will be formed of appropriate insulating material.

Seated on said bottom wall 36a is an energy source 42 here indicated in the form of suitable conventional batteries and having in circuit therewith a pair of contacts 40 shown in opposed relation and being suitably secured to be positioned by said member 36. Said contacts are particularly formed as illustrated to provide a support for a heating member 39 indicated as being in the form of a conventional heating element comprising a coil 39a within a ceramic slab forming the body portion of the member. One of said contacts 40 is shown in the form of a conventional pin type of contact being disposed through an aperture in said ceramic slab to contact said coil 39a as illustrated. The other of said contacts has extending therefrom a line 45 which connects said contact with said switch 47 and thence to said coil 39a. Said line 45 will extend upwardly through said housing through said aperture 48 and will be threaded through said chain 27 to be connected with said switch 47.

Seated on the upper surface of said heating element and within said chamber 37 is a flat relatively shallow receptacle 49 adapted to contain particulated incense 51 therein which upon being heated and vaporized by said heating element provides the desired fragrance or odor.

Extending through the vertex 22 is an aperture 55 and upstanding from said aperture within said housing and in circuit with said batteries in a conventional manner is an electrical receptacle 56 adapted to receive a conventional bayonet type of plug such as will be provided though not shown in the censer holding member and battery charger 49.

Said holding and battery charging member 49 has within its upper surface a recess 51 adapted to receive the lower portion of said encircling member 25 and the adjacent portion of said encircling member 25 and the adjacent portion of said housing 12. The charging element in said support member 49 is provided with a line 52 which will run to a suitable current supply. The specific structure of the battery charging member is not part of the invention herein and will be of a known structure.

The operation of the censer described above will appear to be quite obvious from the description given.

The censer is conveniently carried about and readily operated from the holding end of the chain 27, as by the thumb of the holding hand. The holding member and battery charger 49 is portable whereby said censer may be positioned in any desirable place with the heating element 39 energized or not as may be desired.

It is seen that through the door 15 all of the working parts are easily reached and are readily removable as for replacement.

Thus it is seen that I have provided a simply and efficiently formed and simply operable electric censer having a self-contained energy supply and providing for a convenient removal and replacement of the working parts therein.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An electric censer structure having in combination:
   a housing having a chamber therein,
   said housing disposed within an encircling frame, a hinged door in said housing,
a heating element disposed within said chamber,
batteries disposed within said chamber in circuit with said heating element,
an incense receptacle seated on said heating element,
a holding member extending from said frame member adjacent the upper end portion of said housing,
a switch carried by said holding member, and
means connecting said switch into circuit with said batteries and said heating element.

2. The structure set forth in claim 1:
means comprising a battery charger and providing a chamber to receive and seat said censer structure, and
means placing said battery charger into circuit with said batteries.

3. An electric censer structure having in combination:
a housing having an apertured upper portion,
said housing having a chamber therein,
a frame member encircling said housing and having said housing secured thereto,
a hinged door in said housing for communication with said chamber,
a heating element disposed within a lower portion of said chamber,
means comprising an electrical energy source disposed in said chamber in circuit with said heating element,
an incense receptacle seated on said element,
an elongated flexible holding means secured to the upper portion of said housing,
a switch carried by said last mentioned means, and
means placing said switch into circuit with said energy means and said heating element.

4. The structure set forth in claim 3:
said housing comprising a pair of rectangular pyramidical portions vertically disposed in opposed relation having abutting base portions,
the upper of said pyramidical portions comprising said apertured upper portion and having said door disposed therein,
an insulating member disposed in the lower of said pyramidical portions, said insulating member having a chamber therein housing said energy means, said heating element and said incense receptacle, and
said frame member comprising a flat walled ring having engagement with the respective vertex portions of said housing and being secured thereto.

5. An electric censer structure having in combination:
a housing having a chamber therein, said housing tapering from a transverse medial line towards either end thereof to an upper and a lower vertex,
the upper portion of said housing having a perforate wall structure and the lower portion thereof having an imperforate wall structure,
a door formed in said upper perforate portion,
an insulating lining member disposed within said lower imperforate portion, said lining member having a chamber therein,
means comprising an electrical energy source disposed in said last mentioned chamber,
a heating element in circuit with said energy source disposed in said last mentioned chamber,
an incense receptacle seated on said heating element,
a ring-like member encircling said housing having engagement with the upper and lower vertex of said housing and being secured thereto,
a handle member extending from the upper vertex of said housing,
a switch carried on said handle, and
means placing said switch into circuit with said energy source and said heating element.

References Cited
UNITED STATES PATENTS

| | | | |
|---|---|---|---|
| 1,845,432 | 2/1932 | McRae et al. | 21—116 |
| 2,228,505 | 1/1941 | Carter et al. | 21—119 |
| 2,434,825 | 1/1948 | Williams et al. | 219—274 X |

RICHARD M. WOOD, *Primary Examiner.*

C. L. ALBRITTON, *Assistant Examiner.*